(12) United States Patent
Madjlesi et al.

(10) Patent No.: US 12,049,313 B2
(45) Date of Patent: *Jul. 30, 2024

(54) VIBRATION-DAMPED AIRCRAFT WHEEL BIN

(71) Applicant: AIRBUS CANADA MANAGING GP INC., Quebec (CA)

(72) Inventors: Abdolreza Madjlesi, Ontario (CA); Thineshan Kathirchelvan, Ontario (CA)

(73) Assignee: AIRBUS CANADA MANAGING GP INC., Quebec (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/072,819

(22) Filed: Dec. 1, 2022

(65) Prior Publication Data

US 2023/0090793 A1   Mar. 23, 2023

Related U.S. Application Data

(63) Continuation of application No. 16/955,185, filed as application No. PCT/IB2018/060200 on Dec. 17, 2018, now Pat. No. 11,541,988.

(Continued)

(51) Int. Cl.
*B64C 7/00* (2006.01)
*B64C 1/40* (2006.01)
(Continued)

(52) U.S. Cl.
CPC ............... *B64C 7/00* (2013.01); *B64C 1/40* (2013.01); *B64C 25/001* (2013.01);
(Continued)

(58) Field of Classification Search
CPC  B64C 7/00; B64C 1/40; B64C 25/001; B64C 2025/003; B64C 2220/00; G10K 11/172
See application file for complete search history.

(56) References Cited

U.S. PATENT DOCUMENTS 4,106,587 A    8/1978  Nash et al.
4,271,219 A *  6/1981  Brown ................. B32B 3/12
                                                    428/116

(Continued)

FOREIGN PATENT DOCUMENTS

EP    1232945 A1    8/2002
EP    3048041 A1    7/2016

OTHER PUBLICATIONS

International Search Report; priority document, Pub Date Apr. 24, 2019.

*Primary Examiner* — Rodney A Bonnette
(74) *Attorney, Agent, or Firm* — Greer, Burns & Crain, Ltd.

(57) ABSTRACT

An aircraft fairing includes a fairing body having an exterior fairing wall and at least one wheel bin. The at least one wheel bin has a side wall extending from an opening in the exterior fairing wall to an end wall. The side wall and the end wall define a cavity of the at least one wheel bin in fluid communication with the opening in the exterior fairing wall. An acoustic resonator is mounted to an outer surface of the side wall of the at least one wheel bin and is in fluid communication with the cavity. The acoustic resonator has a resonant frequency substantially similar to a cavity modal frequency of the at least one wheel bin at an aircraft flight condition.

16 Claims, 7 Drawing Sheets

Related U.S. Application Data

(60) Provisional application No. 62/608,234, filed on Dec. 20, 2017.

(51) Int. Cl.
    *B64C 25/00*     (2006.01)
    *G10K 11/172*     (2006.01)

(52) U.S. Cl.
    CPC ...... *G10K 11/172* (2013.01); *B64C 2025/003* (2013.01); *B64C 2220/00* (2013.01)

(56) References Cited

U.S. PATENT DOCUMENTS

| | | | |
|---|---|---|---|
| 6,179,086 B1* | 1/2001 | Bansemir | G10K 11/172 181/290 |
| 2002/0139900 A1 | 10/2002 | Porte et al. | |
| 2007/0169992 A1 | 7/2007 | Wasif et al. | |
| 2009/0184200 A1* | 7/2009 | Lin | B32B 7/12 244/119 |
| 2015/0041586 A1 | 2/2015 | Nakashima et al. | |
| 2016/0009067 A1* | 1/2016 | Gerken | B32B 37/146 156/217 |
| 2016/0214720 A1 | 7/2016 | Hara et al. | |
| 2019/0039722 A1* | 2/2019 | Adamson | B64C 25/16 |

\* cited by examiner

VIBRATION-DAMPED AIRCRAFT WHEEL BIN

CROSS-REFERENCES TO RELATED APPLICATIONS

This Application is a divisional of U.S. application Ser. No. 16/955,185, filed on Jun. 18, 2020, which was filing under 35 U.S.C. 371 of International Application No. PCT/IB2018/060200, filed on Dec. 17, 2018, which claimed the benefit of U.S. Provisional Patent Application No. 62/608,234, filed on Dec. 20, 2017, the entire disclosures of which are incorporated herein by way of reference.

FIELD OF THE INVENTION

The application relates generally to structural components for aircraft and, more particularly, to reducing vibration in a fairing of an aircraft.

BACKGROUND OF THE INVENTION

Aircraft experience vibrations and pressure loading in structural components of the aircraft, such as fairings. These vibrations can result from aerodynamic effects. For example, during flight, air-flow over an open end of each wheel bin causes a pressure fluctuation of air within the wheel bin at a resonance frequency of the cavity of the wheel bin. The pressure fluctuation can excite either the wheels or part of the landing gear stored in the wheel bin, and can cause undesirable vibration in the wheel bin which is transferred to a wing-to-body fairing (WTBF), and ultimately, to the rest of the fuselage.

SUMMARY OF THE INVENTION

In accordance with an aspect of the present disclosure, there is provided an aircraft fairing, comprising: a fairing body having an exterior fairing wall and at least one wheel bin, the at least one wheel bin having a side wall extending from an opening in the exterior fairing wall to an end wall, the side wall and the end wall defining a cavity of the at least one wheel bin in fluid communication with the opening in the exterior fairing wall; and an acoustic resonator mounted to an outer surface of the side wall of the at least one wheel bin and in fluid communication with the cavity, the acoustic resonator having a resonant frequency substantially similar to a cavity modal frequency of the at least one wheel bin at an aircraft flight condition.

In an embodiment, the acoustic resonator has a neck with a first end attached to the outer surface of the side wall of the at least one wheel bin, the first end having a neck opening defined in the side wall in fluid communication with the cavity of the at least one wheel bin, the neck extending a neck length from the neck opening to a second end disposed away from the outer surface of the side wall, the second end of the neck being in a sealed configuration.

In an embodiment, the acoustic resonator includes a resonator housing sealingly mounted to the outer surface of the side wall and enclosing the neck, the resonator housing and the outer surface defining an interior volume of the resonator housing, the second end of the neck having a second end opening being in fluid communication with the interior volume of the resonator housing.

In an embodiment, the acoustic resonator includes a heating element mounted to the resonator housing.

In an embodiment, the second end of the neck is closed.

In an embodiment, the resonant frequency of the acoustic resonator is defined by adjusting at least one of a diameter of the neck opening and the neck length.

In an embodiment, the first end of the neck is attached to the side wall at a location thereon closer to the end wall of the at least one wheel bin than to the opening in the exterior fairing wall.

In an embodiment, a distance along the side wall of the at least one wheel bin is defined from the opening in the exterior fairing wall to the end wall, the first end of the neck being attached to the side wall at a location thereon corresponding to 25% to 75% of the distance.

In an embodiment, the acoustic resonator is a Helmholtz resonator.

In accordance with another aspect of the present disclosure, there is provided an aircraft, comprising: a landing gear having at least two wheels connected by a wheel axle; and an aircraft fairing comprising: a fairing body having an exterior fairing wall and at least one wheel bin, the at least one wheel bin having a side wall extending from an opening in the exterior fairing wall to an end wall, the side wall and the end wall defining a cavity of the at least one wheel bin in fluid communication with the opening in the exterior fairing wall, the cavity sized to receive the at least two wheels and the wheel axle of the landing gear, a cavity modal frequency of the at least one wheel bin being defined upon the at least two wheels and the wheel axle of the landing gear being positioned within the cavity and upon the aircraft operating at an aircraft flight condition; and an acoustic resonator mounted to an outer surface of the side wall of the at least one wheel bin and in fluid communication with the cavity, the acoustic resonator having a resonant frequency substantially similar to the cavity modal frequency of the at least one wheel bin at the aircraft flight condition.

In an embodiment, the acoustic resonator has a neck with a first end attached to the outer surface of the side wall of the at least one wheel bin, the first end having a neck opening defined in the side wall in fluid communication with the cavity of the at least one wheel bin, the neck extending a neck length from the neck opening to a second end disposed away from the outer surface of the side wall, the second end of the neck being in a sealed configuration.

In an embodiment, the acoustic resonator includes a resonator housing sealingly mounted to the outer surface of the side wall and enclosing the neck, the resonator housing and the outer surface defining an interior volume of the resonator housing, the second end of the neck having a second end opening being in fluid communication with the interior volume of the resonator housing.

In an embodiment, the acoustic resonator includes a heating element mounted to the resonator housing.

In an embodiment, the second end of the neck is closed.

In an embodiment, the resonant frequency of the acoustic resonator is defined by adjusting at least one of a diameter of the neck opening and the neck length.

In an embodiment, the first end of the neck is attached to the side wall at a location thereon closer to the end wall of the at least one wheel bin than to the opening in the exterior fairing wall.

In an embodiment, a distance along the side wall of the at least one wheel bin is defined from the opening in the exterior fairing wall to the end wall, the first end of the neck being attached to the side wall at a location thereon corresponding to 25% to 75% of the distance.

In an embodiment, the resonant frequency of the acoustic resonator has a first value upon the aircraft being grounded, and a second value upon the aircraft operating at the aircraft flight condition, the first value being greater than the second value.

In accordance with yet another aspect of the present disclosure, there is provided a method of dampening a pressure buildup in an open wheel bin of an aircraft, the method comprising: attaching an acoustic resonator to a side wall of the wheel bin to be in fluid communication with an interior of the wheel bin; and tuning the acoustic resonator to have a resonant frequency substantially similar to a cavity modal frequency of the wheel bin when the aircraft operates at an aircraft flight condition.

In an embodiment, tuning the acoustic resonator includes adjusting at least one of a diameter and a length of the acoustic resonator.

In an embodiment, tuning the acoustic resonator includes tuning the acoustic resonator to have the resonant frequency substantially similar to the cavity modal frequency when the aircraft operates at a cruise flight condition.

In an embodiment, tuning the acoustic resonator includes tuning the acoustic resonator to a first value of the resonant frequency when the aircraft is grounded, the resonant frequency having a second value upon the aircraft operating at the aircraft flight condition, the first value being greater than the second value.

In an embodiment, attaching the acoustic resonator includes attaching the acoustic resonator to a location of the side wall where air pressure fluctuation amplitudes are highest.

In an embodiment, attaching the acoustic resonator includes attaching the acoustic resonator to a location of the side wall closer to an end wall of the wheel bin than to an opening of the wheel bin.

In an embodiment, attaching the acoustic resonator to the location of the side wall includes attaching the acoustic resonator to the location of the side wall being 25% to 75% of a distance along the side wall between the opening and the end wall of the wheel bin.

In an embodiment, the method further includes heating air within the acoustic resonator.

In accordance with yet another aspect of the present disclosure, there is provided an aircraft wheel bin, comprising: a side wall extending between an opening at one end of the wheel bin to a closed end wall at another end of the wheel bin, the side wall and the end wall defining a cavity of the wheel bin in fluid communication with the opening; and an acoustic resonator mounted to an outer surface of the side wall and in fluid communication with the cavity, the acoustic resonator having a resonant frequency substantially similar to a cavity modal frequency of the wheel bin at an aircraft flight condition.

In an embodiment, the acoustic resonator has a neck with a first end attached to the outer surface of the side wall, the first end having a neck opening defined in the side wall in fluid communication with the cavity, the neck extending a neck length from the neck opening to a second end disposed away from the outer surface of the side wall, the second end of the neck being in a sealed configuration.

In an embodiment, the acoustic resonator includes a resonator housing sealingly mounted to the outer surface of the side wall and enclosing the neck, the resonator housing and the outer surface defining an interior volume of the resonator housing, the second end of the neck having a second end opening being in fluid communication with the interior volume of the resonator housing.

In an embodiment, the acoustic resonator includes a heating element mounted to the resonator housing.

In an embodiment, the second end of the neck is closed.

In an embodiment, the resonant frequency of the acoustic resonator is defined by adjusting at least one of a diameter of the neck opening and the neck length.

In an embodiment, the first end of the neck is attached to the side wall at a location thereon closer to the end wall than to the opening.

In an embodiment, a distance along the side wall is defined from the opening to the end wall, the first end of the neck being attached to the side wall at a location thereon corresponding to 25% to 75% of the distance.

BRIEF DESCRIPTION OF THE DRAWINGS

Reference is now made to the accompanying figures in which.

DETAILED DESCRIPTION OF THE PREFERRED EMBODIMENTS

Figure 1A:
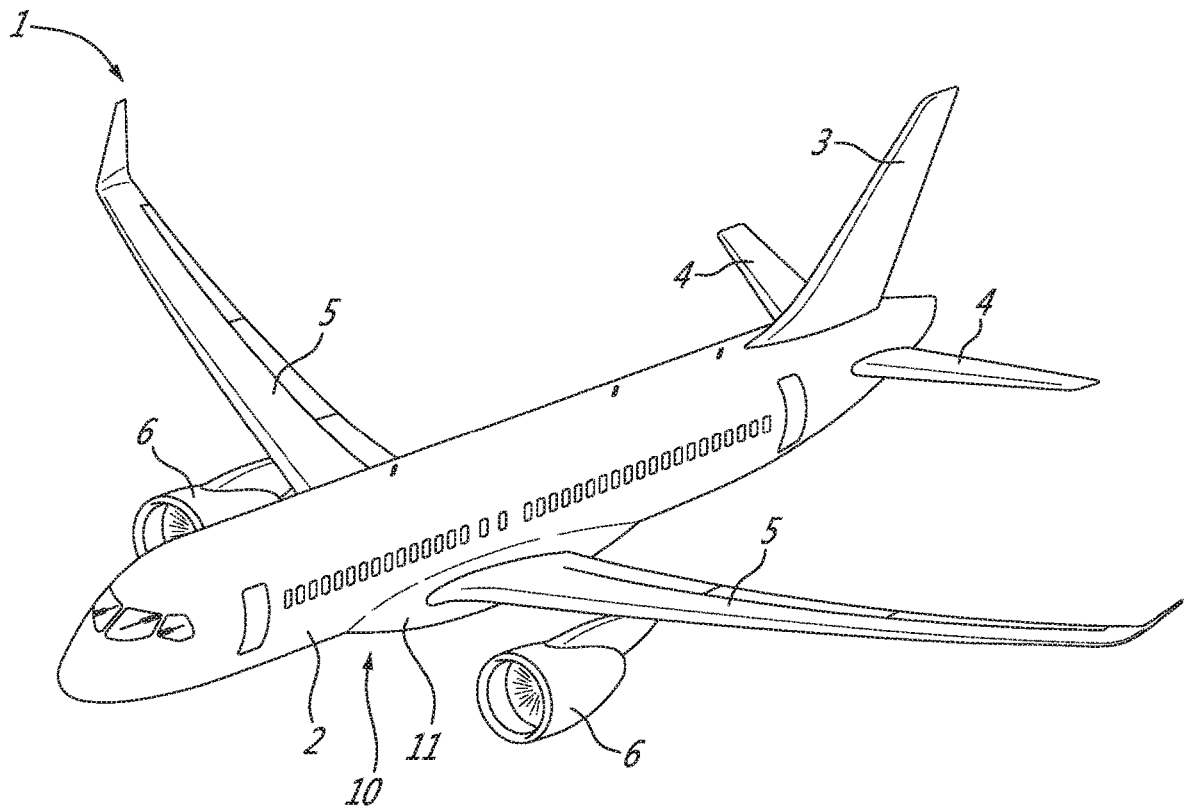
FIG. 1A is a schematic tridimensional view of an aircraft, according to an embodiment of the present disclosure.

FIG. 1A illustrates an aircraft 1. Some of the components of the aircraft 1 are shown and described herein. The aircraft 1 has a fuselage 2 having a fore end at which a cockpit is located, and an aft end supporting a tail assembly, with the cabin generally located between the cockpit and the tail assembly. The tail assembly includes a vertical stabilizer 3 with a rudder, and horizontal stabilizers 4 with elevators. The tail assembly has a fuselage-mounted tail, but other configurations may also be used for the aircraft 1, such as cruciform, T-tail, etc. Wings 5 project laterally from the fuselage 2. The aircraft 1 has engines 6 supported by the wings 5, although the engines 6 could also be mounted to the fuselage 2. The aircraft 1 is shown as a jet-engine aircraft, but may also be a propeller aircraft.

Figure 1B:
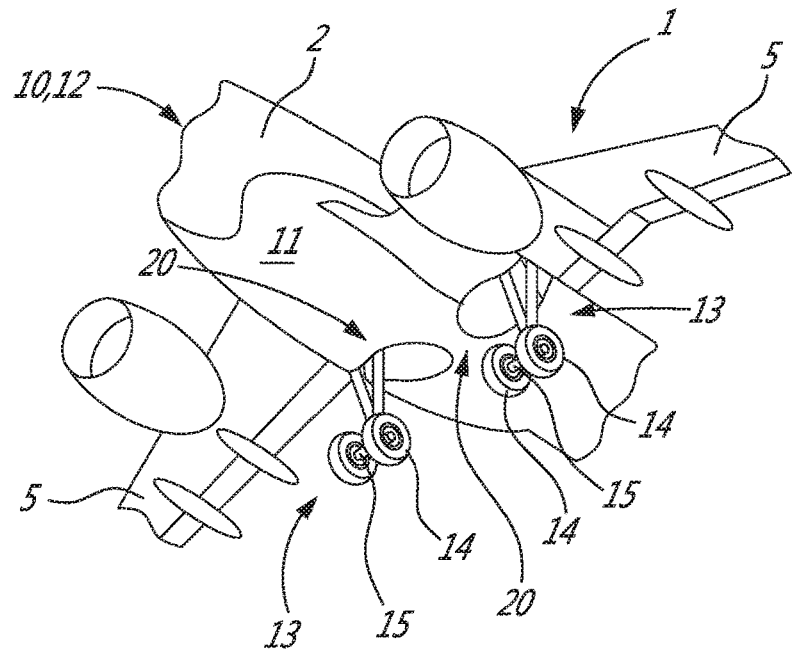
FIG. 1B is a schematic tridimensional view of a fairing of the aircraft of FIG. 1A.

Referring to FIGS. 1A and 1B, the fuselage 2 includes an aircraft fairing 10. The aircraft fairing 10 (sometimes referred to herein as simply "fairing 10") is a structure or member of the fuselage 2 with a stream-lined and smooth exterior fairing wall 11. In the depicted embodiment, the fairing 10 is a wing-to-body fairing 12 (abbreviated as WTBF 12) along the underside of the aircraft 1. Although the fairing 10 will sometimes be referred to herein simply as the WTBF 12, it will be appreciated that other types of fairings 10 are within the scope of the present disclosure. The WTBF 12 helps to join the wings 5 of the aircraft 1 to the fuselage 2. The WTBF 12 includes one or more wheel bins 20 or wheel wells formed in the WTBF 12. In the depicted embodiment, the WTBF 12 is a composite structure, and the two wheel bins 20 are formed as depressions in the body of the WTBF 12 during the manufacture of the composite WTBF 12. In an alternate embodiment, each wheel bin 20 is separate from the WTBF 12 and is attached thereto. Each wheel bin 20 receives and houses part of a landing gear 13 of the aircraft 1 when the aircraft 1 is in flight. Referring to FIG. 1B, each landing gear 13 has two wheels 14 connected together and mechanically linked by a wheel axle 15. The wheels 14 are rotatable about an axis of the wheel axle 15. When the aircraft 1 has taken off, the landing gear 13 manipulates each pair of wheels 14 to rotate them inward and store them and the wheel axle 15 within one of the wheel bins 20. When stored during flight, the wheel axle 15 of each landing gear 13 is substantially upright. Other configurations for the landing gear 13 are also possible.

Figure 2A:
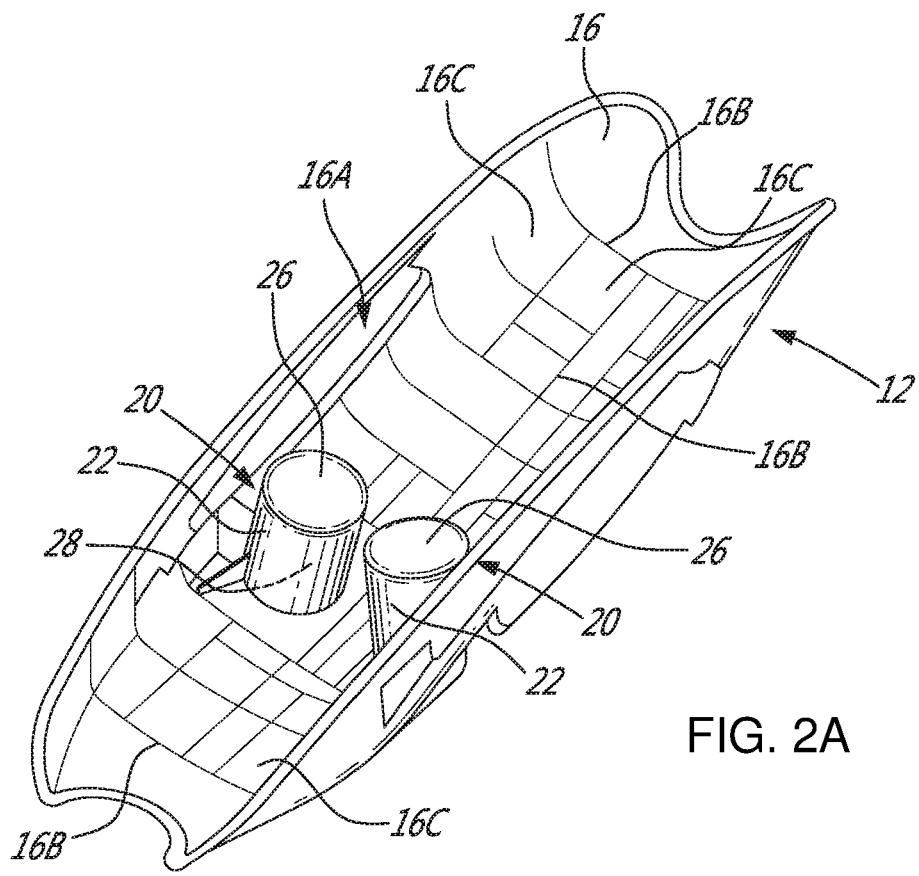
FIG. 2A is a schematic tridimensional view of the fairing of FIG. 1B.
Figure 2B:
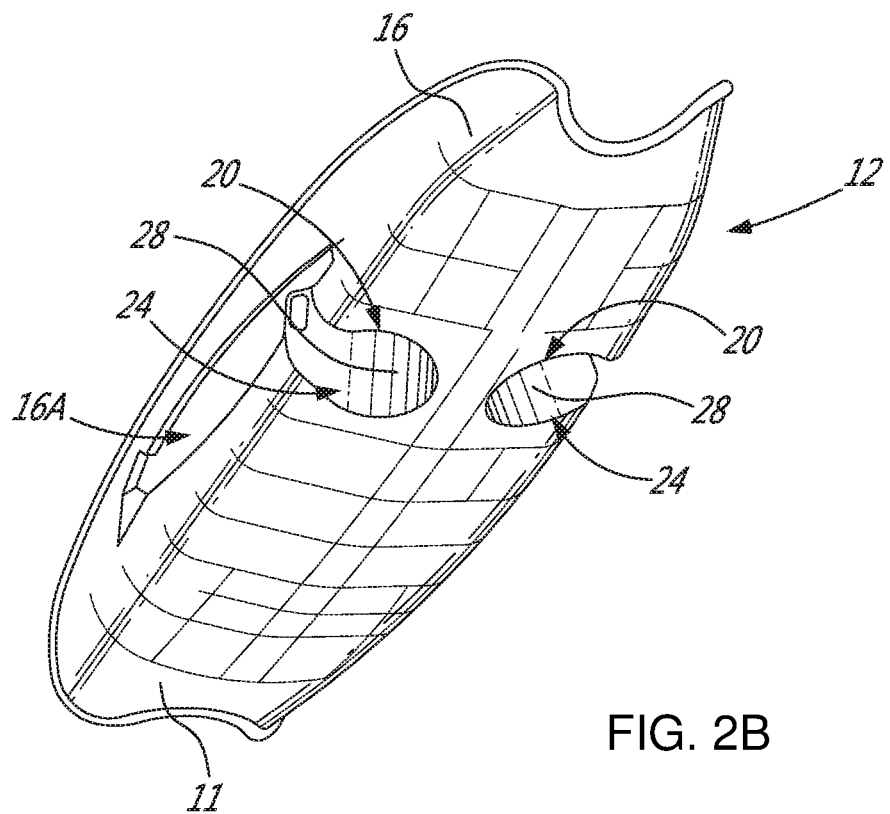
FIG. 2B is another schematic tridimensional view of the fairing of FIG. 1B.

The structure of the WTBF 12 and the wheel bins 20 is more clearly shown in FIGS. 2A and 2B. The fairing 10 includes a fairing body 16 which forms the corpus of the fairing 10 and provides structure thereto. The fairing body 16 has elongated wing openings 16A along opposed longitudinal sides of the fairing body 16 for receiving the wings 5 of the aircraft. The fairing body 16 also has multiple linkage members 16B which reinforce the fairing body 16 and help to attach the fairing body 16 to the rest of the fuselage 2. The linkage members 16B divide the fairing body 16 into adjacent and interconnected body panels 16C.

Each wheel bin 20 is formed as a depression or trench in the exterior fairing wall 11. A side wall 22 of each wheel bin 20 extends into the fairing body 16. The side wall 22 is oriented substantially upright. In the depicted embodiment, each wheel bin 20 has only one round side wall 22 which defines a cylindrical wheel bin 20. In an alternate embodiment, each wheel bin 20 has more than one side wall 22, and has a polyhedral shape. The side wall 22 circumscribes an opening 24 in the exterior fairing wall 11, which defines an inlet or access for each wheel bin 20. The opening 24 is sized to receive therethrough the wheels 14 and the wheel axle 15 of the landing gear 13 when the aircraft 1 is in flight. The opening 24 remains substantially uncovered during flight, and is primarily sealed and made flush with the exterior fairing wall 11 by a lowermost wheel 14 of the landing gear 13. Each wheel bin 20 in the depicted embodiment is therefore an "open" wheel bin 20, such that air is allowed to flow over and through the wheel bin 20 when the aircraft 1 is in flight.

Still referring to FIGS. 2A and 2B, the extremity of each wheel bin 20 opposite to the opening 24 is closed, such that each wheel bin 20 is open at one of its ends and closed at the other end. Each wheel bin 20 has a closed end wall 26 which, in the depicted embodiment, is free of apertures. The end wall 26 is the distal, and in the depicted embodiment, uppermost member of each wheel bin 20. The side wall 22 of each wheel bin 20 therefore extends into the fairing body 16 from the opening 24 to the end wall 26. The side wall 22 and end wall 26 of each wheel bin 20 enclose and define a cavity 28 of the wheel bin 20. The cavity 28 is sized and shaped to receive therein the wheels 14 and the wheel axle 15 of the landing gear 13. The cavity 28 is in fluid communication with the opening 24 such that air can enter and exit the cavity 28 through the opening 24. Each wheel bin 20 is therefore hollow.

On some aircraft 1, a vibration has been observed in the cabin of the aircraft 1 around a certain frequency band. Analysis suggests that the source of the vibration experienced in the cabin is a vibrational mode of one or both of the wheel bins 20 of the WTBF 12. When the aircraft 1 is in flight, it is believed that air flowing over the opening 24 of each wheel bin 20 causes air pressure fluctuations inside the wheel bin 20 at a natural frequency of the cavity 28. This excites the structure of the wheel bins 20, which in turn excites the WTBF 12. The WTBF 12 is linked to the rest of the fuselage 2, and as a result, the excitation of the wheel bins 20 is felt inside the cabin. The energy of the air flowing over the opening 24 increases as the aircraft 1 gains speed, and the level of the pressure fluctuation at the resonance frequency of the cavity 28 also increases. It is therefore believed that higher aircraft speed will result in higher excitation of the wheel bins 20.

Figure 3A:
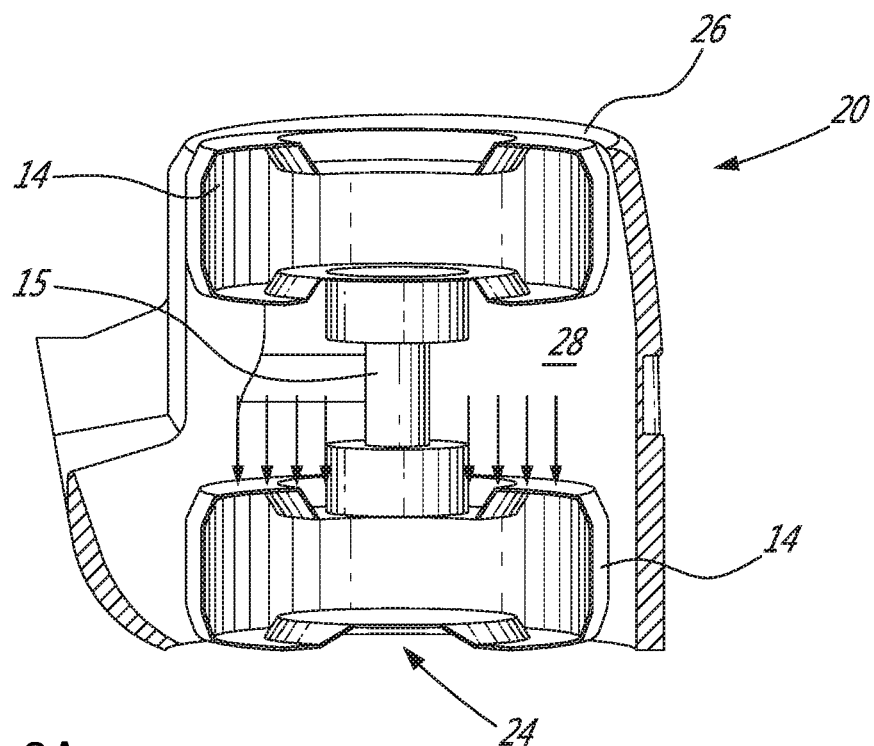
FIG. 3A is a schematic cross-sectional side elevational view of a wheel bin of the fairing of FIG. 1B, showing wheels and an axle of a landing gear of the aircraft.
Figure 3B:
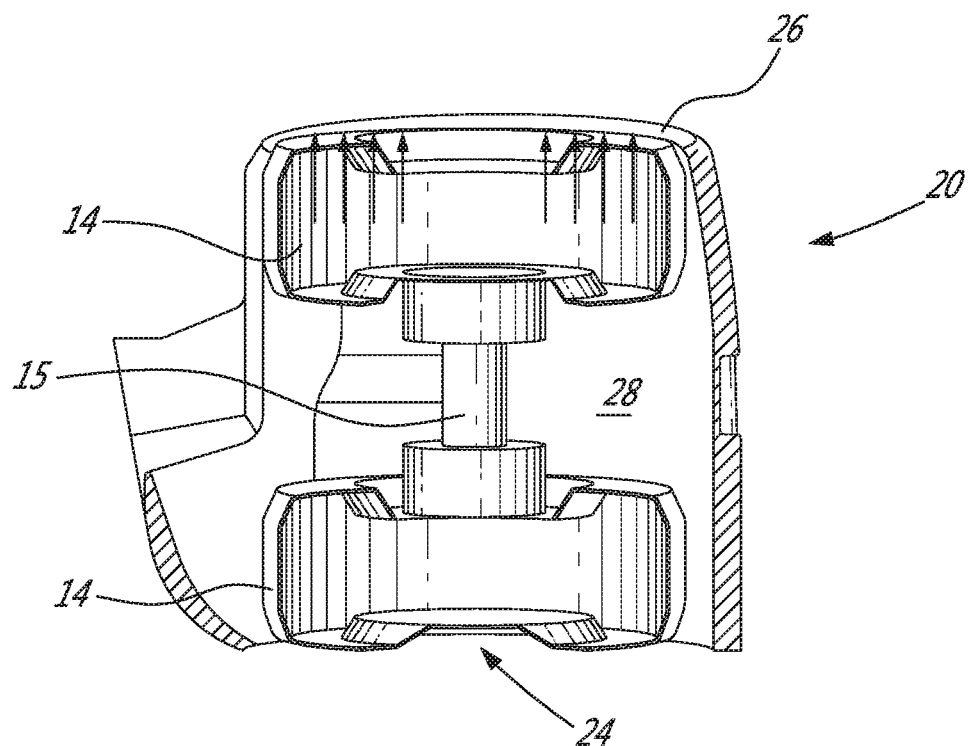
FIG. 3B is another cross-sectional side elevational view of the wheel bin of FIG. 3A.

Referring to FIGS. 3A and 3B, it is believed that the air pressure build up within the cavity 28 excites both the end wall 26 of the wheel bin 20 (see the arrows in FIG. 3B) and the upper surface of the lower wheel 14 (see the arrows in FIG. 3B). This excitation drives the wheel bin 20 vertically up and down, causing the undesirable vibration. This movement of the wheel bin 20 in turn shakes the WTBF 12. Since the WTBF 12 is attached to the fuselage 2 via the linkage members 16B, the induced vibration experienced by the WTBF 12 is transferred to the cabin and has been observed to manifest itself as unacceptable floor vibration in the center fuselage. It can therefore be appreciated that the cavities 28 of the wheel bins 20 have a cavity natural or modal frequency when the wheels 14 and axle 15 of the landing gear 13 are stored therein. The cavity modal frequency is present during a flight condition of the aircraft 1, such as cruise, when air is flowing over and into the cavity 28 of each wheel bin 20 via the opening 24 therein. It will be appreciated that this particular modal frequency may not be present during all flight conditions of the aircraft 1, or may be present within acceptable levels. For example, when the flight condition of the aircraft 1 is ground operation, take-off, or landing, the cavity modal frequency may not get excited or may be within acceptable levels. Stated differently, the cavity modal frequency may not be present during all operating modes of the aircraft 1.

One example of the cavity modal frequency that has been observed at the aircraft flight condition of cruise is in the 50 Hz band. More particularly, the cavity modal frequency has been estimated or measured to be about 56 Hz. At this frequency, the amplitude of the excitation experienced by the wheel bin 20 may result in undesirable vibrations being transferred to the fuselage 2. It may therefore be desirable to dampen or eliminate the cavity modal frequency at the aircraft flight condition before its effects are transferred to the WTBF 12, and ultimately, to the cabin of the aircraft 1.

Figure 4A:
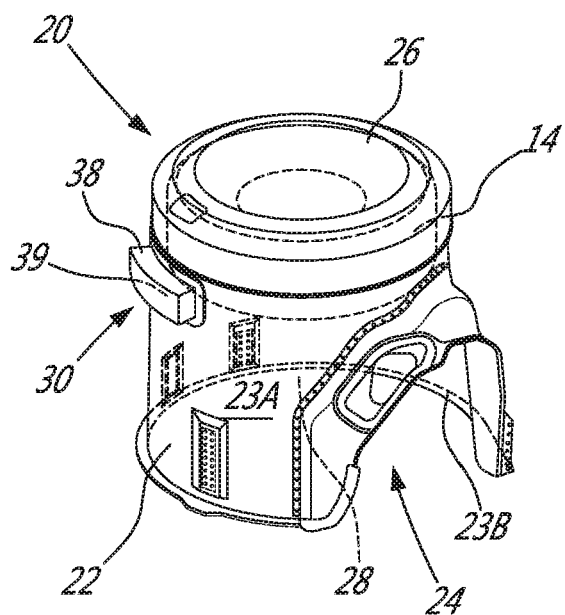
FIG. 4A is a schematic tridimensional view of a wheel bin of the fairing of FIG. 1B, shown with an acoustic resonator according to another embodiment of the present disclosure.
Figure 4B:
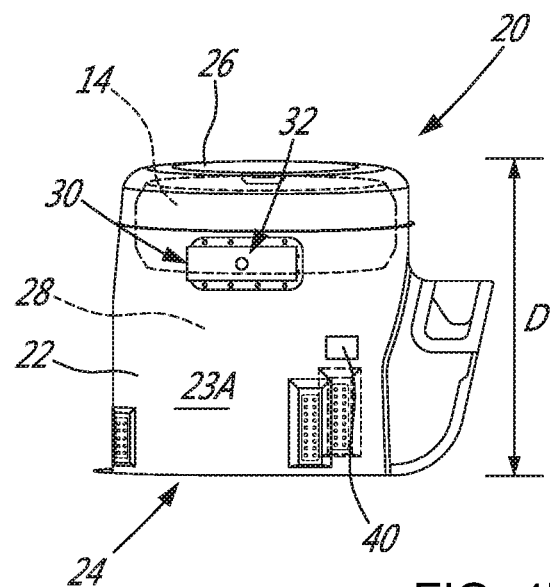
FIG. 4B is another schematic tridimensional view of the wheel bin and acoustic resonator of FIG. 4A.
Figure 4C:
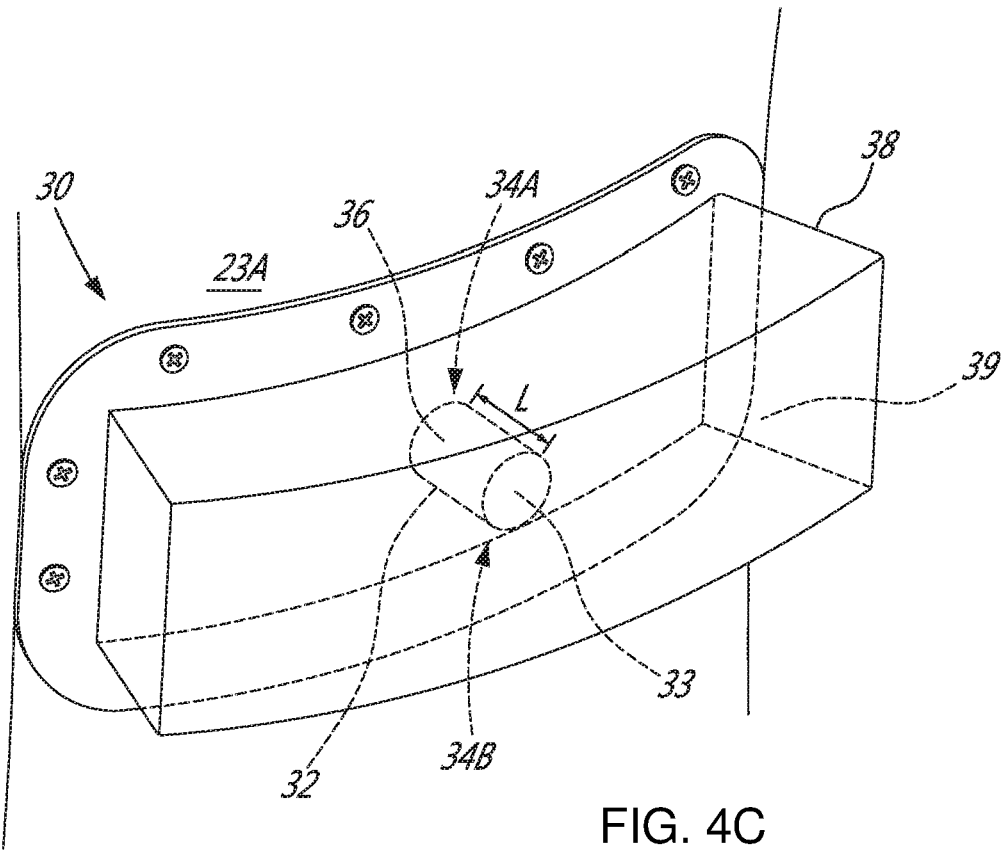
FIG. 4C is a schematic tridimensional view of the acoustic resonator of FIG. 4A.

Referring to FIGS. 4A to 4C, the WTBF 12 is provided with an acoustic resonator 30 to dampen or eliminate the acoustic mode of the wheel bin 20 at the aircraft flight condition. The acoustic resonator 30 is a damper or device that exhibits resonance or resonant behavior at a resonant frequency. Stated differently, the acoustic resonator 30 naturally oscillates at its resonant frequency with greater amplitude than it would at other frequencies. The resonant frequency of the acoustic resonator 30 is predetermined, in that it is established or fixed in advance based on the anticipated or expected cavity modal frequency at the aircraft flight condition.

The acoustic resonator 30 is mounted to an outer surface 23A of the side wall 22 of each wheel bin 20. Each side wall 22 also has an inner surface 23B that faces the cavity 28 of the wheel bin 20. The acoustic resonator 30 is mounted to the side wall 22 such that it is in fluid communication with the cavity 28 of the wheel bin 20. In this context, "fluid communication" refers to the ability of air to move freely between the cavity 28 and the acoustic resonator 30 via the side wall 22. Many possible configurations for mounting the acoustic resonator 30 to the side wall 22 are possible to achieve this functionality, and some of these are described below in greater detail.

In order to dampen or eliminate the cavity modal frequency, the acoustic resonator 30 is provided with the predetermined and pre-set resonant frequency. The resonant frequency is substantially similar to the cavity modal frequency at the targeted aircraft flight condition. By "substantially similar", it is understood that the resonant frequency is the same as the cavity modal frequency at the aircraft flight condition, or is close enough to the cavity modal frequency at the aircraft flight condition in value such that excitation of the wheel bin 20 is dampened to an acceptable level. Stated differently, the resonant frequency does not have to be identical to the cavity modal frequency at the aircraft flight condition.

The acoustic resonator 30 is tuned to the resonant frequency so that it is similar to the anticipated or expected cavity modal frequency of the cavity 28 of the wheel bin 20 at the aircraft flight condition. It is understood that the air temperature of the air entering the cavity 28 of the wheel bin 20 at the aircraft flight condition of cruise is lower than the air temperature of air at the aircraft flight condition of ground operation. It is understood that as the temperature of air decreases and as the air becomes thinner at elevation, the resonant frequency of the acoustic resonator 30 will also change. In most instances, the acoustic resonator 30 is tuned to the resonant frequency when the aircraft 1 is on the ground, prior to flight. Therefore, it may be necessary to compensate for the cooler, thinner air in the acoustic resonator 30 at the aircraft flight condition when tuning the acoustic resonator 30 on the ground.

In order for the resonant frequency to be substantially similar to the cavity modal frequency at the aircraft flight condition, it may be necessary to tune the acoustic resonator 30 so that the value of the resonant frequency is higher when the aircraft 1 is on the ground. Therefore, the resonant frequency of the acoustic resonator 30 has a first value upon the aircraft 1 being grounded, and has a second value upon the aircraft 1 operating at the aircraft flight condition. The first value of the resonant frequency is greater than the second value. The acoustic resonator 30 is therefore tuned for operating at the aircraft flight condition. In the example where the expected cavity modal frequency at the aircraft flight condition is about 56 Hz, it may be necessary to tune the acoustic resonator 30 so that resonant frequency has a first value on the ground of about 58 Hz, so that at the aircraft flight condition the resonant frequency will have a second value of about 56 Hz which is the same as the expected cavity modal frequency.

In can therefore be appreciated that the acoustic resonator 30 is tuned to an acoustic mode of the wheel bin 20 at the aircraft flight condition. The similarity in the resonant frequency and the cavity modal frequency at the aircraft flight condition helps to dampen or eliminate the vibration produced by wheel bin 20 at the aircraft flight condition. The acoustic resonator 30 is therefore configured to damp out the acoustic mode of the wheel bin 20 at the aircraft flight condition. The acoustic resonator 30 therefore helps to dampen or eliminate the undesirable excitation at its source (i.e., at the wheel bin 20), and thus before the undesirable excitation can be transmitted through the WTBF 12 to the cabin. In contrast, some conventional solutions seek to mitigate the effect of the excitation of the wheel bin, rather than to dampen or eliminate it, by seeking to control the path of the excitation to the cabin.

Referring to FIGS. 4A to 4C, the acoustic resonator 30 has a neck 32 extending outwardly from the side wall 22 of the wheel bin 20. The neck 32 is a tuning conduit whose shape and length, among other characteristics, can be modified to achieve the desired resonant frequency, as described in greater detail below. A first end 34A of the neck 32 is attached to the outer surface 23A of the side wall 22. The first end 34A has a neck opening 36 defined in the side wall 22 in fluid communication with the cavity 28 of the wheel bin 20. Air is therefore free to flow between the cavity 28 and the interior of the neck 32 via the neck opening 36. The neck 32 has a neck length L defined between the neck opening 36 and a second end 34B of the neck 32. The neck 32 is therefore an elongated conduit extending between the first and second ends 34A 34B. The neck 32 in the depicted embodiment is a cylindrical tube. In an alternate embodiment, the neck 32 has more than one wall, and has a polyhedral shape. The second end 34B is located away from the outer surface 23A of the side wall 22 and is in a sealed configuration. The expression "sealed configuration" refers to the position of the second end 34B of the neck 32 within an enclosure defined by a closed body, or to the second end 34B being itself a closed member, as described in greater detail below.

Figure 5A:
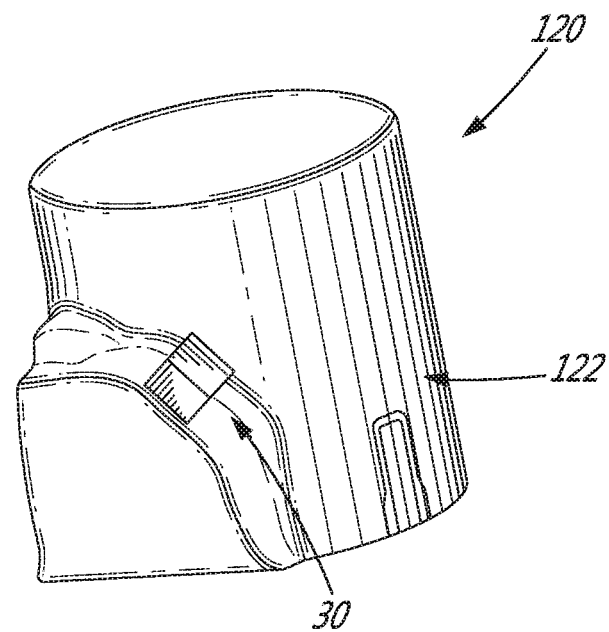
FIG. 5A is a schematic tridimensional view of a wheel bin of a fairing according to yet another embodiment of the present disclosure, shown with the acoustic resonator of FIG. 4A.
Figure 5B:
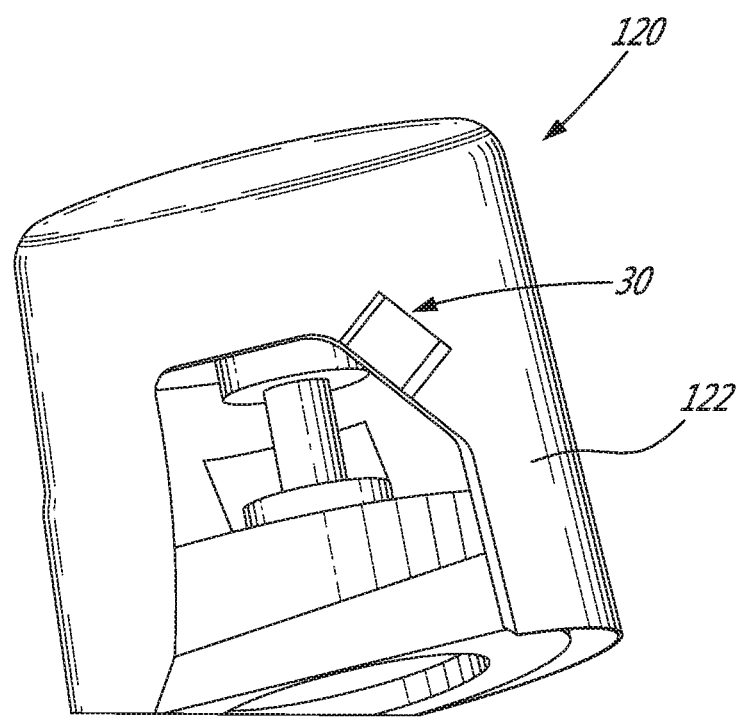
FIG. 5B is another schematic tridimensional view of the wheel bin and acoustic resonator shown in FIG. 5A.

The embodiment of the acoustic resonator 30 shown in FIGS. 4A to 4C includes a resonator housing 38. The resonator housing 38 in the depicted embodiment is a box with interconnected walls. Other shapes are possible. The resonator housing 38 encloses the neck 32 and is sealingly mounted to the outer surface 23A of the side wall 22 of the wheel bin 20 to form a tight seal with the outer surface 23A. Air may therefore only enter and exit the resonator housing 38 via the neck 32. The resonator housing 38 and the outer surface 23A cooperate to bound an interior volume 39 of the resonator housing 38. The surfaces of the resonator housing 38 therefore cooperate with the outer surface 23A to delimit the interior volume 39. In the depicted embodiment, the sealed configuration of the second end 34B of the neck 32 is achieved by providing the second end 34B with a second end opening 33 which is in fluid communication with the interior volume 39 of the resonator housing 38. The neck 32 in FIGS. 4A to 4C is therefore open at both its first and second ends 34A, 34B, such that air is free to flow between the cavity 28 of the wheel bin 20 and the interior volume 39 of the resonator housing 38. The acoustic resonator 30 in the depicted embodiment is, or acts as, a Helmholtz resonator. The Helmholtz-style acoustic resonator 30 helps to dampen the air pressure fluctuations in the cavity 28 of the wheel bin 20 during the aircraft flight condition, and thus is tuned to reduce the modal energy causing the excitation in the wheel bin 20 to dampen or eliminate the source of the undesirable vibration. FIGS. 5A and 5B show the acoustic resonator 30 attached to another embodiment of the wheel bin 120. The acoustic resonator 30 is attached to the side wall 122 of the wheel bin 120 at a location thereon that is different from the location on the side wall 22 at which the acoustic resonator 30 is attached in FIGS. 4A and 4B.

The location of the acoustic resonator 30 along the side wall 22, 122 can affect the dampening effect provided by the acoustic resonator 30. It may be most effective to attach the acoustic resonator 30 to the side wall 22, 122 at a location on the side wall 22, 122 where it is expected that air pressure fluctuation amplitudes will be highest within the cavity 28 at the aircraft flight condition. This location is typically closer to the end wall 26 of the wheel bin 20 than to the opening 24. Referring to FIGS. 4A to 4C, the first end 34A of the neck 32 is attached to the side wall 22 at a location on the side wall 22 that is closer to the end wall 26 of the wheel bin 20 than it is to the opening 24 in the exterior fairing wall 11. A distance D along the side wall 22 is defined from the opening 24 to the end wall 26. The first end 34A of the neck 32 may be attached to the side wall 22 at a location corresponding to 25% to 75% of the distance D from the opening 24. The first end 34A of the neck 32 may be attached to the side wall 22 at location between an uppermost surface and a lowermost surface of the wheels 14 of the landing gear 13 in the cavity 28.

The resonant frequency of the acoustic resonator 30 can be determined by adjusting one or more of the diameter of the neck opening 36, the neck length L, and the value of the interior volume 39 of the resonator housing 38. It may be possible to determine the resonant frequency of the acoustic resonator 30 based on the formula below:

$$f = \frac{c}{2\pi}\sqrt{\frac{S}{VL}}$$

Where "f" is the resonant frequency; "c" is the speed of sound through a medium and can be calculated using $\sqrt{\gamma RT}$; "S" is the cross-sectional area of the neck 32; "V" is the volume of the interior volume 39 of the resonator housing 38, and "L" is the equivalent length of the neck 32.

Figure 6A:
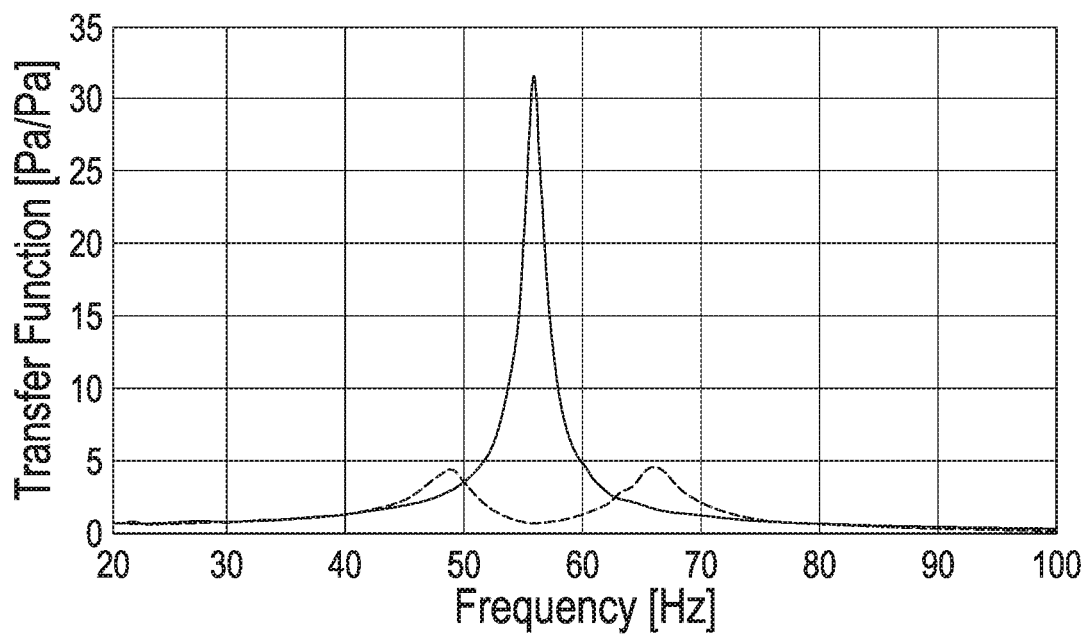
FIG. 6A is a graph of amplitude of excitation versus frequency.

FIG. 6A shows the results of simulated testing to determine the effect of the acoustic resonator 30. The graph shows the amplitude of excitation of the wheel bin 20 in decibels (dB) as a function of frequency. The Y-axis value is the transfer function between input at the opening 24 of the wheel bin 20 and noise build up inside the cavity 28. At a frequency of about 56 Hz, which corresponds to the expected cavity modal frequency at the aircraft flight condition, the solid line shows that the wheel bin 20 experiences peak modal excitation of about 32 Pa in response to excitation of 1 Pa in the opening 24 of the wheel bin 20. However, when the acoustic resonator 30 is in position against the wheel bin 20, there is barely any excitation of the wheel bin 20 at the same frequency of about 56 Hz, as shown by the broken line (around 1 Pa). The acoustic resonator 30 in at least this simulated test therefore helps to contribute about a 30 dB decrease in the amplitude of excitation (i.e., a decrease in vibration) of the wheel bin 20 at the expected cavity modal frequency at the aircraft flight condition.

Figure 6B:
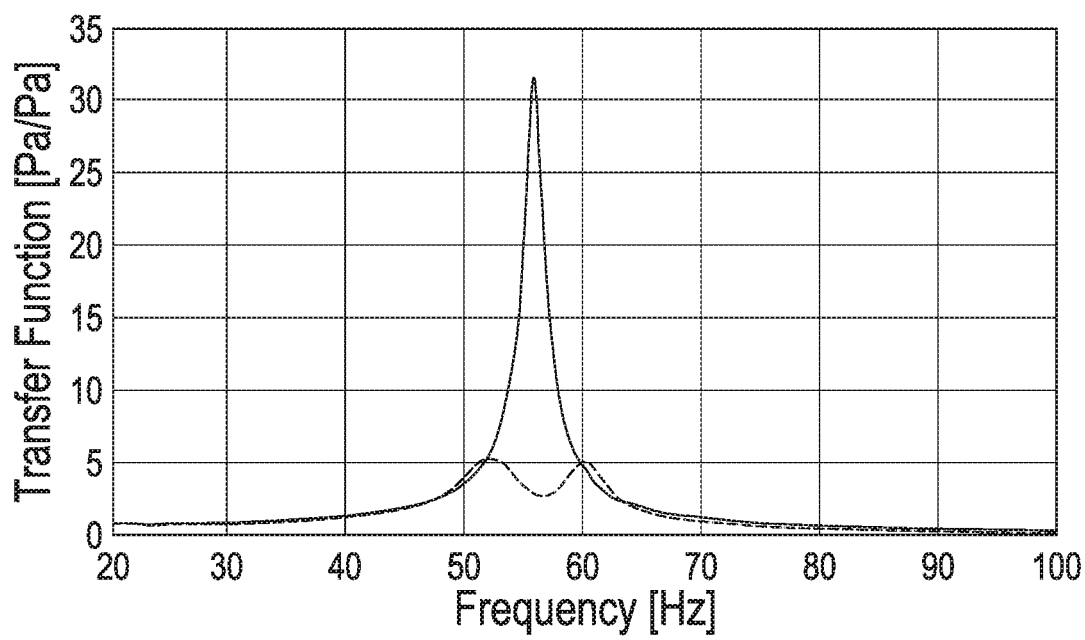
FIG. 6B is another graph of amplitude of excitation versus frequency.

FIG. 6B shows the results of simulated testing to determine the effect of the acoustic resonator 30. The graph shows the amplitude of excitation of the wheel bin 20 in decibels (dB) as a function of frequency. At a frequency of about 56 Hz, which corresponds to the expected cavity modal frequency at the aircraft flight condition, the solid line shows that the wheel bin 20 experiences peak modal excitation of about 32 Pa in response to 1 Pa excitation in the opening 24 of the wheel bin 20. When the acoustic resonator 30 is in position against the wheel bin 20, there is a reduction in the excitation of the wheel bin 20 at the same frequency of about 56 Hz, as shown by the broken line (around 2 Pa). The acoustic resonator 30 in at least this simulated test therefore helps to contribute about a 24 dB decrease in the amplitude of excitation (i.e., a decrease in dynamic pressure) of the wheel bin 20 at the expected cavity modal frequency at the aircraft flight condition. The decrease in the amplitude of excitation shown in FIG. 6B is less than the decrease shown in FIG. 6A because the acoustic resonator 30 in the simulated test for FIG. 6B was placed closer to the opening 24 of the wheel bin 20 than it was in the simulated test for FIG. 6B.

Figure 7:
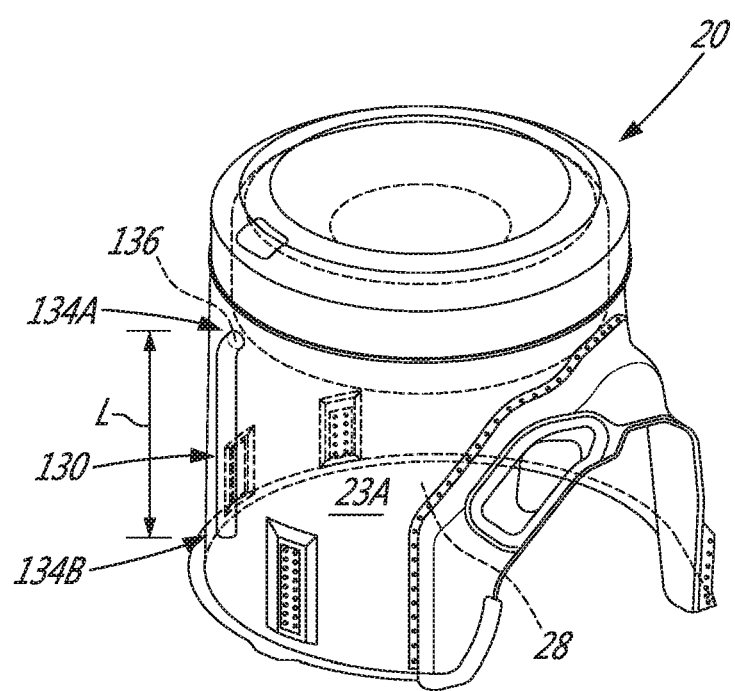
FIG. 7 is a schematic tridimensional view of a wheel bin of the fairing of FIG. 1B, shown with an acoustic resonator according to yet another embodiment of the present disclosure.

Another embodiment of the acoustic resonator 130 is shown in FIG. 7. The wheel bin 20 shown in FIG. 7 is identical to the one shown in FIGS. 4A and 4B, and therefore like reference numbers will be used to identify like features. The neck extends outwardly from the side wall 22 of the wheel bin 20. The first end 134A of the neck is attached to the outer surface 23A of the side wall 22. The neck opening 136 defined in the side wall 22 is in fluid communication with the cavity 28 of the wheel bin 20. Air is therefore free to flow between the cavity 28 and the interior of the neck via the neck opening 136. The neck has a neck length L defined between the neck opening 136 and the second end 134B of the neck. The neck is therefore an elongated conduit extending between the first and second ends 134A, 134B. The neck of the depicted embodiment has a greater length L than the length L of the neck 32 in FIGS. 4A to 4C. The second end 134B is located away from the outer surface 23A of the side wall 22. In the depicted embodiment, the sealed configuration of the second end 134B of the neck is achieved by closing the second end 134B such that air is prevented from flowing therethrough. The elongated neck of the depicted embodiment is therefore open at the first end 134A, where it is in fluid communication with the cavity 28 of the wheel bin 20, and closed at the second end 134B. Such an acoustic resonator 130 can act similarly to a ¼ wavelength tube resonator. The desired resonant frequency of the acoustic resonator 130 is achieved by adjusting the diameter of the neck opening 136 and/or the neck length L as needed.

The acoustic resonators 30, 130 described above are both "passive" devices in operation because they help to dampen or eliminate the undesirable vibration of the wheel bin 20,120 due only to their design. If desired, additional "active" dampening means can be provided to assist or supplement the passive functionality of the acoustic resonators 30,130. Similarly, the acoustic resonator 30,130 may include a heating element 40 (see, e.g., FIG. 4B) to heat the air within the neck or resonator housing 38. The heating element 40 can be used to keep the air temperature within the neck or the resonator housing 38 constant throughout all aircraft flight conditions so that the resonant frequency of the acoustic resonator 30,130 remains constant at different altitudes. The heating element 40 may also be used to deliberately change the resonant frequency of the acoustic resonator 30,130 for applications where the acoustic mode may shift.

The acoustic resonator 30, 130 is therefore a relatively simple structure that is easy to construct and thus cost effective. It can be made of materials to be lightweight. Its construction and position with respect to the wheel bin 20 allow it to be easily inspected, maintained, and replaced.

There is also disclosed herein a method of dampening a vibration or dynamic air pressure build-up in the wheel bin 20 and/or the WTBF 12. The method may be applied when assembling or constructing a fairing 10 or wheel bin 20, or may be applied to retrofit an existing fairing 10 or wheel bin 20. The method includes attaching the acoustic resonator 30, 130 to the side wall 22 of the wheel bin 20 to be in fluid communication with the interior of the wheel bin 20. The method includes tuning the acoustic resonator 30, 130 to have a resonant frequency being substantially similar to a cavity modal frequency of the cavity 28 of the wheel bin 20 when the aircraft 1 operates at the aircraft flight condition.

Embodiments disclosed herein include:

A. An aircraft fairing, comprising: a fairing body having an exterior fairing wall and at least one wheel bin, the at least one wheel bin having a side wall extending from an opening in the exterior fairing wall to an end wall, the side wall and the end wall defining a cavity of the at least one wheel bin in fluid communication with the opening in the exterior fairing wall: and an acoustic resonator mounted to an outer surface of the side wall of the at least one wheel bin and in fluid communication with the cavity, the acoustic resonator having a resonant frequency substantially similar to a cavity modal frequency of the at least one wheel bin at an aircraft flight condition.

B. An aircraft comprising: a landing gear having at least two wheels connected by a wheel axle; and an aircraft fairing comprising: a fairing body having an exterior fairing wall and at least one wheel bin, the at least one wheel bin having a side wall extending from an opening in the exterior fairing wall to an end wall, the side wall and the end wall defining a cavity of the at least one wheel bin in fluid communication with the opening of the exterior fairing wall, the cavity sized to receive the at least two wheels and the wheel axle of the landing gear, a cavity modal frequency of the at least one wheel bin being defined upon the at least two wheels and the wheel axle of the landing gear being positioned within the cavity and upon the aircraft opening at an aircraft flight condition; and an acoustic resonator mounted to an outer surface of the side wall of the at least one wheel bin and in fluid communication with the cavity, the acoustic resonator having a resonant frequency substantially similar to the cavity modal frequency of the at least one wheel bin at the aircraft flight condition.

C. A method of dampening a pressure buildup in an open wheel bin of an aircraft, the method comprising: attaching an acoustic resonator to a side wall of the wheel bin to be in fluid communication with an interior of the wheel bin; and tuning the acoustic resonator to have a resonant frequency substantially similar to a cavity modal frequency of the wheel bin where the aircraft operates at an aircraft flight condition.

D. An aircraft wheel bin, comprising: a side wall extending between an opening at one end of the wheel bin to a closed end wall at another end of the wheel bin, the side wall and the end wall defining a cavity of the wheel bin in fluid communication with the opening; and an acoustic resonator mounted to an outer surface of the side wall and in fluid communication with the cavity, the acoustic resonator having a resonant frequency substantially similar to a cavity modal frequency of the wheel bin at an aircraft flight condition.

Each of the embodiments, A, B, C and D may have one or more of the following additional elements in any combination.

Element 1: the acoustic resonator has a neck with a first end attached to the outer surface of the side wall of the at least one wheel bin, the first end having a neck opening defined in the side wall in fluid communication with the cavity of the at least one wheel bin, the neck extending a neck length from the neck opening to a second end disposed away from the outer surface of the side wall, the second end of the neck being in a sealed configuration.

Element 2: the acoustic resonator includes a resonator housing sealingly mounted to the outer surface of the side wall and enclosing the neck, the resonator housing and the outer surface defining an interior volume of the resonator housing, the second end of the neck having a second end opening being in fluid communication with the interior volume of the resonator housing.

Element 3: the acoustic resonator includes a heating element mounted to the resonator housing.

Element 4: the second end of the neck is closed.

Element 5: the resonant frequency of the acoustic resonator is defined by adjusting at least one diameter of the neck opening and the neck length.

Element 6: the first end if the neck is attached to the side wall at a location thereon closer to the end wall of the at least one wheel bin than to the opening in the exterior fairing wall.

Element 7: distance along the side wall of the at least one wheel bin is defined from the opening in the exterior fairing wall to the end wall, the first end of the neck being attached to the side wall at a location thereon corresponding to 25% to 75% of the distance.

Element 8: the acoustic resonator is Helmholtz resonator.

Element 9: the acoustic resonator has a neck with a first end attached to the outer surface of the side wall of the at least one wheel bin, the first end having a neck opening defined in the side wall in fluid communication with the cavity of the at least one wheel bin, the neck extending a neck length from the neck opening to a second end disposed away from the outer surface of the side wall, the second end of the neck being in a sealed configuration.

Element 10: the resonant frequency of the acoustic resonator has a first value upon the aircraft being grounded, and a second value upon the aircraft operating at the aircraft flight condition, the first value being greater than the second value.

Element 11: tuning the acoustic resonator includes adjusting at least one of a diameter and a length of the acoustic resonator.

Element 12: tuning the acoustic resonator includes tuning the acoustic resonator to have the resonant frequency substantially similar to the cavity modal frequency when the aircraft operates at a cruise flight condition.

Element 13: tuning the acoustic resonator includes tuning the acoustic resonator to a first value of the resonant frequency when the aircraft is grounded, the resonant frequency having a second value upon the aircraft operating at the aircraft flight condition, the first value being greater than the second value.

Element 14: attaching the acoustic resonator includes attaching the acoustic resonator to a location of the side wall where air pressure fluctuation amplitudes are highest.

Element 15: attaching the acoustic resonator includes attaching the acoustic resonator to a location of the side wall closer to an end wall of the wheel bin than to an opening of the wheel bin.

Element 16: attaching the acoustic resonator to the location of the side wall includes attaching the acoustic resonator to the location of the side wall being 25% to 75% of a distance along the side wall between the opening and the end wall of the wheel bin.

Element 17: heating air within the acoustic resonator.

Element 18: the acoustic resonator has a neck with a first end attached to the outer surface of the side wall, the first end having a neck opening defined in the side wall in fluid communication with the cavity, the neck extending a neck length from the neck opening to a second end disposed away from the outer surface of the side wall, the second end of the neck being in a sealed configuration.

Element 19: the acoustic resonator includes a resonator housing sealingly mounted to the outer surface of the side wall enclosing the neck, the resonator housing and the outer surface defining an interior volume of the resonator housing, the second end of the neck having a second end opening being in fluid communication with the interior volume of the resonator housing.

Element 20: the first end of the neck is attached to the side wall at a location thereon closer to the end wall than to the opening.

Element 21: a distance along the side wall is defined from the opening to the end wall, the first end of the neck being attached to the side wall at a location thereon corresponding to 25% to 75% of the distance.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

What is claimed is:

1. A method of dampening a pressure buildup in an open wheel bin of an aircraft, the method comprising:
    attaching an acoustic resonator to a side wall of the wheel bin to be in fluid communication with an interior of the wheel bin; and
    tuning the acoustic resonator to have a resonant frequency substantially similar to a cavity modal frequency of the wheel bin when the aircraft operates at an aircraft flight condition.

2. The method as defined in claim 1, wherein tuning the acoustic resonator includes adjusting at least one of a diameter and a length of the acoustic resonator.

3. The method as defined in claim 1, wherein tuning the acoustic resonator includes tuning the acoustic resonator to have the resonant frequency substantially similar to the cavity modal frequency when the aircraft operates at a cruise flight condition.

4. The method as defined in claim 1, wherein tuning the acoustic resonator includes tuning the acoustic resonator to a first value of the resonant frequency when the aircraft is grounded, the resonant frequency having a second value upon the aircraft operating at the aircraft flight condition, the first value being greater than the second value.

5. The method as defined in 1, wherein attaching the acoustic resonator includes attaching the acoustic resonator to a location of the side wall where air pressure fluctuation amplitudes are highest.

6. The method as defined in claim 1, wherein attaching the acoustic resonator includes attaching the acoustic resonator to a location of the side wall closer to an end wall of the wheel bin than to an opening of the wheel bin.

7. The method as defined in claim 6, wherein attaching the acoustic resonator to the location of the side wall includes attaching the acoustic resonator to the location of the side wall being 25% to 75% of a distance along the side wall between the opening and the end wall of the wheel bin.

8. The method as defined in claim 1, further comprising heating air within the acoustic resonator.

9. An aircraft wheel bin, comprising:
    a side wall extending between an opening at one end of the wheel bin to a closed end wall at another end of the wheel bin, the side wall and the end wall defining a cavity of the wheel bin in fluid communication with the opening; and
    an acoustic resonator mounted to an outer surface of the side wall and in fluid communication with the cavity, the acoustic resonator having a resonant frequency substantially similar to a cavity modal frequency of the wheel bin at an aircraft flight condition.

10. The aircraft wheel bin as defined in claim 9, wherein the acoustic resonator has a neck with a first end attached to the outer surface of the side wall, the first end having a neck opening defined in the side wall in fluid communication with the cavity, the neck extending a neck length from the neck opening to a second end disposed away from the outer surface of the side wall, the second end of the neck being in a sealed configuration.

11. The aircraft wheel bin as defined in claim 10, wherein the acoustic resonator includes a resonator housing sealingly mounted to the outer surface of the side wall and enclosing the neck, the resonator housing and the outer surface defining an interior volume of the resonator housing, the second end of the neck having a second end opening being in fluid communication with the interior volume of the resonator housing.

12. The aircraft wheel bin as defined in claim 11, wherein the acoustic resonator includes a heating element mounted to the resonator housing.

13. The aircraft wheel bin as defined in claim 12, wherein the second end of the neck is closed.

14. The aircraft wheel bin as defined in claim 10, wherein the resonant frequency of the acoustic resonator is defined by adjusting at least one of a diameter of the neck opening and the neck length.

15. The aircraft wheel bin as defined in claim 10, wherein the first end of the neck is attached to the side wall at a location thereon closer to the end wall than to the opening.

16. The aircraft wheel bin as defined in claim 10, wherein a distance along the side wall is defined from the opening to the end wall, the first end of the neck being attached to the side wall at a location thereon corresponding to 25% to 75% of the distance.

* * * * *